(No Model.) 2 Sheets—Sheet 2.
F. J. LAMPTON.
Wheel Cultivator.
No. 236,341. Patented Jan. 4, 1881.
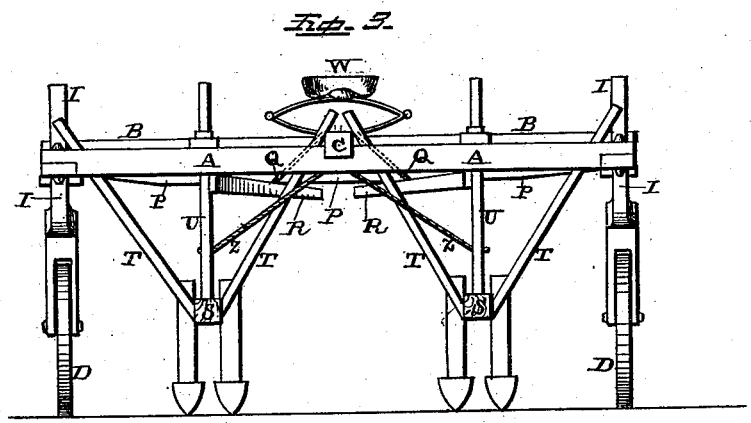
Witnesses
Wm H Mortimer
A C Kiskadden
Inventor
F. J. Lampton,
per
F. A. Lehmann,
Atty

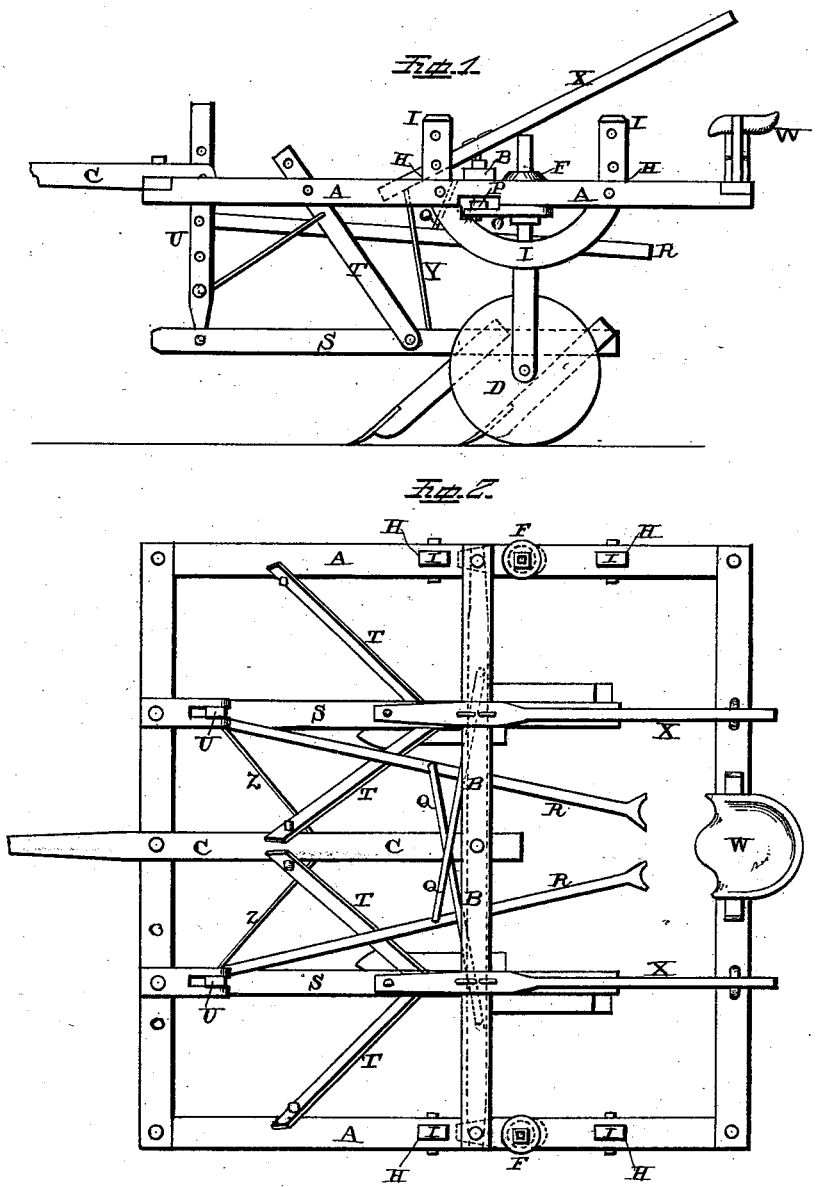

UNITED STATES PATENT OFFICE.

FLAVIUS J. LAMPTON, OF HAMMONVILLE, KENTUCKY.

WHEEL-CULTIVATOR.

SPECIFICATION forming part of Letters Patent No. 236,341, dated January 4, 1881.

Application filed October 28, 1880. (No model.)

*To all whom it may concern:*

Be it known that I, FLAVIUS J. LAMPTON, of Hammonville, in the county of Hart and State of Kentucky, have invented certain new and useful Improvements in Wheel-Cultivators; and I do hereby declare the following to be a full, clear, and exact description of the invention, such as will enable others skilled in the art to which it pertains to make and use it, reference being had to the accompanying drawings, which form part of this specification.

My invention relates to an improvement in wheel-cultivators; and it consists in connecting the cultivator-beams with the driving-wheels, whereby, when the levers which are connected with the beams are moved sidewise, the wheels are turned upon their pivots, so as to guide the frame to one side or the other, and thus prevent the necessity of moving the beams themselves, as will be more fully described hereinafter.

Figure 1 is a side elevation of my invention. Fig. 2 is a plan view of the same. Fig. 3 is a front view.

A represents a rectangular frame of any desired size, and which has the brace B extending across its center. The tongue C is secured upon the front end of this frame, and has its rear end secured to the under side of this brace-beam, as shown. The frame A is supported upon the two driving-wheels D, which, instead of being attached to the axle, as is generally the case, are here made to turn upon pivots, like a caster-wheel, for the purpose of guiding the frame from one side to the other, according to where it is desired that the cultivators shall run.

Through the frame, at a suitable distance from the rear of its center, is made an opening, down through which is passed a box, F, which is round upon the greater part of its surface, so as to turn freely in the frame, and which box has a square hole through it, so as to receive a square shank projecting up from the driving-wheel, whereby, when the box is turned, the wheel will turn at the same time. At a suitable distance upon each side of this box is made an opening, H, and up through these openings are passed the upper ends of the U-shaped frame I. This frame has a series of holes through each of its prongs, so that it can be adjusted vertically in the frame according to the height of the corn or other crop which is being cultivated. As the square shoulder on the shank of the wheel bears against the under side of this U-shaped frame, it will readily be seen that by adjusting the frame up or down the frame A can be raised any desired distance above the ground or lowered near to it.

The lower end of each one of the boxes which pass down through the frame A is squared or made rectangular, so as to receive the arms or levers O, which are passed over them, and which arms or levers have their front ends pivoted to the two ends of the cross-bar P, which extends across the under side of the frame. When the boxes are turned in the frame these arms or levers attached to them move horizontally around, and move the rod or lever P endwise across the frame. Secured to this endwise-moving rod, on each side of its center, is a cord, wire, or chain, Q, which cord or chain has its other end attached to one of the foot-levers R.

Instead of the cultivator-beams S being pivoted or otherwise jointed at their front ends, so as to have a free universal movement, as is generally the case, the beams are here braced in position by means of the rods T, so as to have none other than a rising-and-falling movement. These rods T are secured, one to the near side of the frame and the other to the outer edge of the tongue, and have their lower ends pivoted to the side of the beams S. Pivoted to the front end of each beam S is a perforated supporting-rod, U, by means of which the front ends of the beams can be adjusted so as to run shallow or deep, as may be desired. These adjusting-rods are held at their upper ends by means of suitable fastening devices, through which and the rods pivotal bolts are passed, and these fastening devices can be adjusted from one side of the frame to the other by means of a series of holes which are made through the front end of the frame, and thus the front ends of the beams may be turned inward or outward, as may be preferred. Secured to the inner side of each one of these supporting-rods is one of the foot-levers, each one of which is connected to the endwise-moving rod which extends across the under side of the frame by means of the cord, wire, or chain above described, and which cords, wires, or chains pass over the top of the rear end of the tongue, so as to hold the levers always in position ready to receive the driver's feet upon their rear ends.

The driver, sitting upon the seat W, and having one foot upon each of the levers, has only to move the levers sidewise, when the endwise-moving rod will be moved in the same direction, and will cause the boxes through which the shanks of the wheels pass to be turned in one direction or the other, according as it is desired that the frame shall move.

Pivoted upon the top of the horizontal bar which extends across the middle of the frame is a lever, X, for each cultivator-beam, and which levers are connected to the beams by means of chains Y. When the rear ends of these levers are depressed the cultivator-beams are raised or lowered at the will of the driver.

The draft-animals are to be attached to the front end of the cultivator-beams, so that each one will draw directly upon the beam, and not upon the frame. Also, fastened to the supporting-rods T, is a chain, Z, which passes through an eye which is secured to the under side of the tongue, and has its two ends fastened to the two rods. This chain serves to draw the frame along. Should one of the beams have its cultivator catch against an obstruction in the ground it will give backward, while the other is forced in the ground by the position of the pieces upon the same, and thus the other animal is stopped before anything has a chance to break.

The object of my invention is to dispense with the moving of the beams from side to side, so as to avoid obstructions, which is a very difficult thing to do, and move the frame itself in such a manner that the cultivator will be guided without any special effort on the part of the driver.

Having thus described my invention, I claim—

1. The combination of the frame A, having the holes H, with the U-shaped adjustable frame I and wheel D, having a shank which projects up through the frames A I, substantially as shown.

2. In a wheeled cultivator, the combination of the frame A, having the holes H, the vertically-adjustable U-shaped frame I, and wheel D, having a shank which passes up through both frames, with the boxes F, provided with the levers O, connecting-rod P, levers R, cords or chains Q, and the plow-beams, substantially as described.

In testimony that I claim the foregoing I have hereunto set my hand this 19th day of October, 1880.

FLAVIUS J. LAMPTON.

Witnesses:
W. J. DODSON,
I. M. PHILLIPS.